US010270607B2

United States Patent
Nagaraja et al.

(10) Patent No.: US 10,270,607 B2
(45) Date of Patent: Apr. 23, 2019

(54) METHOD AND SYSTEM FOR ROAMED CLIENT DEVICE HANDLING

(71) Applicant: Aruba Networks, Inc., Sunnyvale, CA (US)

(72) Inventors: Harsha Nagaraja, Bangalore (IN); Vithal Suresh Mohare, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 44 days.

(21) Appl. No.: 14/037,250

(22) Filed: Sep. 25, 2013

(65) Prior Publication Data

US 2015/0085734 A1 Mar. 26, 2015

(51) Int. Cl.
*H04L 12/18* (2006.01)
*H04L 12/46* (2006.01)
*H04W 36/08* (2009.01)
*H04L 29/06* (2006.01)

(52) U.S. Cl.
CPC .......... *H04L 12/189* (2013.01); *H04L 12/185* (2013.01); *H04L 12/1886* (2013.01); *H04L 12/4633* (2013.01); *H04L 12/4641* (2013.01); *H04L 69/08* (2013.01); *H04W 36/08* (2013.01)

(58) Field of Classification Search
CPC . H04L 12/189; H04L 12/185; H04L 12/4641; H04L 12/4633; H04L 69/08; H04L 12/1886; H04W 36/08
USPC ........................................................ 370/312
See application file for complete search history.

(56) References Cited

U.S. PATENT DOCUMENTS

| 7,042,865 | B1* | 5/2006 | Meier ..................... H04L 12/18 370/338 |
| 7,885,233 | B2* | 2/2011 | Nagarajan et al. ........... 370/331 |
| 2005/0025160 | A1* | 2/2005 | Meier et al. ............. 370/395.53 |
| 2008/0107109 | A1* | 5/2008 | Michaud ................. H04L 12/12 370/390 |
| 2008/0165705 | A1* | 7/2008 | Umayabashi ........... H04L 45/48 370/256 |
| 2008/0225770 | A1* | 9/2008 | Cho ..................... H04W 76/025 370/312 |

(Continued)

OTHER PUBLICATIONS

"Tunneling protocol"; retrieved from http://web.archive.org/web/20130723184215/http://en.wikipedia.org/wiki/Tunneling_protocol; Jul. 23, 2013 (5 pages).

(Continued)

*Primary Examiner* — Kwang B Yao
*Assistant Examiner* — Moo Jeong
(74) *Attorney, Agent, or Firm* — Hewlett Packard Enterprise Patent Department (57) ABSTRACT

A non-transitory computer readable medium that includes instructions which, when executed by one or more hardware processors, causes performance of operations. The operations include receiving, at a first network device in a first network, a multicast message comprising data to be transmitted at least to two or more client devices that have roamed from the first network to a same second network, determining that at least one client device has roamed from the first network to the second network, and responsive at least to the determining operation, forwarding, by the first network device to a second network device in the second network, a single copy of the data for distribution to each of the two or more client devices.

18 Claims, 7 Drawing Sheets

(56) References Cited

U.S. PATENT DOCUMENTS

| | | | |
|---|---|---|---|
| 2008/0232373 A1* | 9/2008 | Iyer et al. .................... | 370/392 |
| 2009/0046615 A1* | 2/2009 | Shibata .............. | H04L 12/1836 |
| | | | 370/312 |
| 2011/0069705 A1* | 3/2011 | Glasser .............. | H04L 12/1836 |
| | | | 370/390 |
| 2014/0016639 A1* | 1/2014 | Ding et al. .................... | 370/390 |

OTHER PUBLICATIONS

"GRE tunneling"; retrieved from http://web.archive.org/web/20130909015955/http://lartc.org/howto/lartc.tunnel.gre.html; Mar. 9, 2013 (2 pages).

* cited by examiner

400 Multicast Group Structure

| Mobility Tunnel Identifier 1 | First VLAN 1 | Mobility Multicast Group Identifier 1 |
|---|---|---|
| ⋮ | ⋮ | ⋮ |
| Mobility Tunnel Identifier N | First VLAN N | Mobility Multicast Group Identifier N |

402 Mobility Tunnel Identifier
404 First VLAN Identifer
406 Mobility Multicast Group Identifier

*FIG. 4*

500 Client Device Structure

| MAC Address1 | BSSID 1 | Connected VLAN 1 | First VLAN 1 | Flag 1 |
|---|---|---|---|---|
| ⋮ | ⋮ | ⋮ | ⋮ | ⋮ |
| MAC address M | BSSID M | Connected VLAN M | First VLAN M | Flag M |

502 MAC Address
504 BBSID
506 Connected VLAN
508 First VLAN
510 Flag

METHOD AND SYSTEM FOR ROAMED CLIENT DEVICE HANDLING

BACKGROUND

Computer networks allow users to connect to other users and to various sources of content. For example, using a user's computing device, the user may receive information from a remote location. The information is sent by way of packets. A packet a short fixed-length section of data that is transmitted as a unit in an electronic communications network. Packets may be addressed to a single user or to multiple users. When packets are addressed to a single user, the packet includes a destination address specifying the single user. When packets are addressed to multiple users, the packet includes a destination address that specifies the class of users.

OVERVIEW

In general, in one aspect, embodiments relates to a non-transitory computer readable medium that includes instructions which, when executed by one or more hardware processors, causes performance of operations. The operations include receiving, at a first network device in a first network, a multicast message comprising data to be transmitted at least to two or more client devices that have roamed from the first network to a same second network, determining that at least one client device has roamed from the first network to the second network, and responsive at least to the determining operation, forwarding, by the first network device to a second network device in the second network, a single copy of the data for distribution to each of the two or more client devices.

In general, in one aspect, embodiments relates to a system that includes a device including at least one hardware processor. The system is configured to perform operations that include receiving, at a first network device in a first network, a multicast message comprising data to be transmitted at least to two or more client devices that have roamed from the first network to a same second network, determining that at least one client device has roamed from the first network to the network, and responsive at least to the determining operation forwarding, by the first network device to a second network device in the second network, a single copy of the data for distribution to each of the two or more client devices.

In general, in one aspect, embodiments relates to a method that includes receiving, at a first network device in a first network, a multicast message comprising data to be transmitted at least to two or more client devices that have roamed from the first network to a same second network, the first network device including a hardware processor, determining that at least one client device has roamed from the first network to the second network, and responsive at least to the determining operation, forwarding, by the first network device to a second network device in the second network, a single copy of the data for distribution to each of the two or more client devices.

Other aspects will be apparent from the following description and the appended claims.

DETAILED DESCRIPTION

Specific embodiments will now be described in detail with reference to the accompanying figures. Like elements in the various figures are denoted by like reference numerals for consistency. In the Figures, three co-linear dots indicate that additional items of similar type to the preceding and succeeding items with respect to the dots may optionally exist.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

In general, embodiments provide a method and apparatus for roamed client device handling. Specifically, a roamed client device is a computing device that roams from a first network device to a second network device. In one or more embodiments, based on the roaming, a mobility tunnel is created between the first network device and the second network device. The mobility tunnel is a link for the first network device to client devices, which are to receive the multicast packet, via the second network device. Thus, when the first network device receives a multicast packet that includes a destination address specifying a virtual local area network (VLAN) of the first network device, the first network device identifies the mobility tunnel to the second network device, tags the multicast packet with the VLAN of the first network device, and transmits the packet to the second network device using the mobility tunnel.

In the description and the claims, a network device is a first network device when the network device is sending one or more multicast packets to another network device. A network device is a second network device when the network device receives one or more multicast packets. Thus, the use of the terms, "first" and "second" refer to the roles of the network device in relation to a particular transmission of multicast packets. For a different transmission of multicast packets, the second network device may be the first network device and the first network device may be the second network device.

In the present application, the term "multicast" refers to a single transmission to multiple destination client devices. Thus, the term "multicast" as used herein refers to both "multicast" as used in the art and "broadcast" as used in the art. Accordingly, a packet is considered a multicast packet in the present application when the packet is a multicast packet or a broadcast packet.

FIGS. 1-5 show schematic diagrams in accordance with one or more embodiments. While FIGS. 1-5 show a configuration of components, other configurations may be used without departing from the scope of the claims. For example, various components may be combined to create a single component. As another example, the functionality performed by a single component may be split between two or more components.

Figure 1:
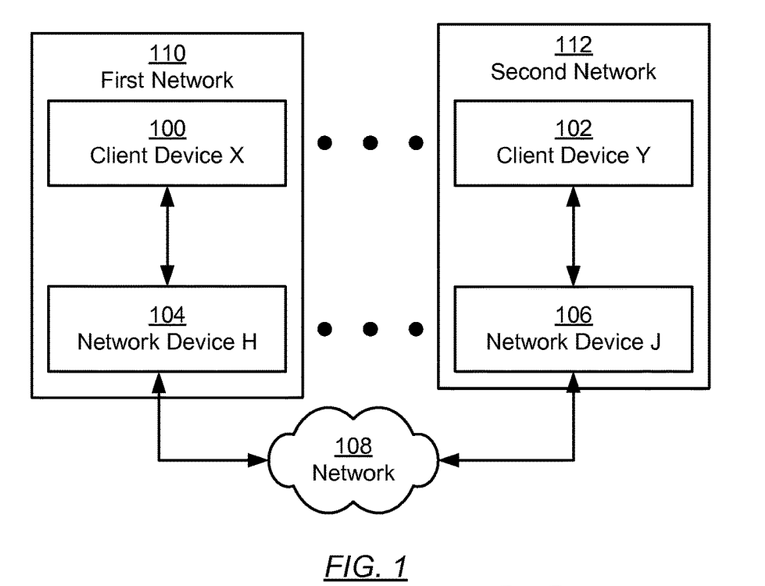
FIGS. 1-5 show schematic diagrams in accordance with one or more embodiments.

Turning to FIG. 1, FIG. 1 shows a schematic diagram of a system in accordance with one or more embodiments. As shown in FIG. 1, the system may include client devices (e.g., client device X (100), client device Y (102)) and network devices (e.g., network device H (104), network device J (106)). The client devices and network devices are discussed below.

A client device (e.g., client device X (100), client device Y (102)) is a computing system in accordance with one or more embodiments. In one or more embodiments, a client device may be a station. For example, the client device (e.g., client device X (100), client device Y (102)) may be a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments. The client devices (e.g., client device X (100), client device Y (102)) may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor.

In one or more embodiments, a client device is a destination of one or more packets. In particular, a client device may execute an application that processes the packets. For example, the packets may be packets of streaming communication (e.g., a video stream, audio stream, or other multimedia stream). By way of another example, packets may be control and management packets like DHCP broadcast packets, Router/Neighbor advertisements. In the example, the client device may include functionality to process the streaming communication and present the streaming to a user viewing an output device on the client device.

A client device (e.g., client device X (100), client device Y (102)) is connected to a network (108) via a network device (e.g., network device H (104), network device J (106)). Specifically, at a particular moment in time, a client device may be connected to a single network device. A network device may be connected to any number of client devices. Further, the number of client devices connected to the network device may vary between network devices and over time. The connection between the client device and the network device may be wired or wireless or direct or indirect.

A network device (e.g., network device H (104), network device J (106)) is a hardware device that is configured to receive multicast packets and transmit multicast packets to the client devices connected to the network device and roamed client devices of the network device. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

By way of an example, a client device may be directly wired or wirelessly communicatively connected to a single access point, which is directly communicatively connected to a single controller, which is connected to the network (e.g., network (108)). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using Wi-Fi, Bluetooth or related standards and that communicates with a wired network.

In the description, a client device may roam from a first controller to a second controller when the client device roams from an access point that is the first controller or is connected to the first controller to another access point that is the second controller or is connected to the second controller. A client device is connected to and/or roams to an access point, when the client device is associated with the access point.

In one or more embodiments, the client devices (e.g., client device X (100), client device Y (102)) and network devices (e.g., network device H (104), network device J (106)) may be in separate networks (e.g., first network (110), second network (112)) that are connected by network (108). Each of the separate networks may be, for example, local area networks, such as separate Internet Protocol (IP) subnets. In some embodiments, a single network device may exist in a single separate network. In such embodiments, the network device (e.g., network device H (104), network device J (106)) in a particular separate network may include functionality to manage the particular separate network. In one or more embodiments, the separate network may include multiple client devices.

Although not shown in FIG. 1, the client devices (e.g., client device X (100), client device Y (102)) and network devices (e.g., network device H (104), network device J (106)) may include hardware and functionality to execute software instructions. Specifically, the software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s) on the client devices (e.g., client device X (100), client device Y (102)) and/or network devices (e.g., network device H (104), network device J (106)), is configured to perform embodiments.

Figure 2:
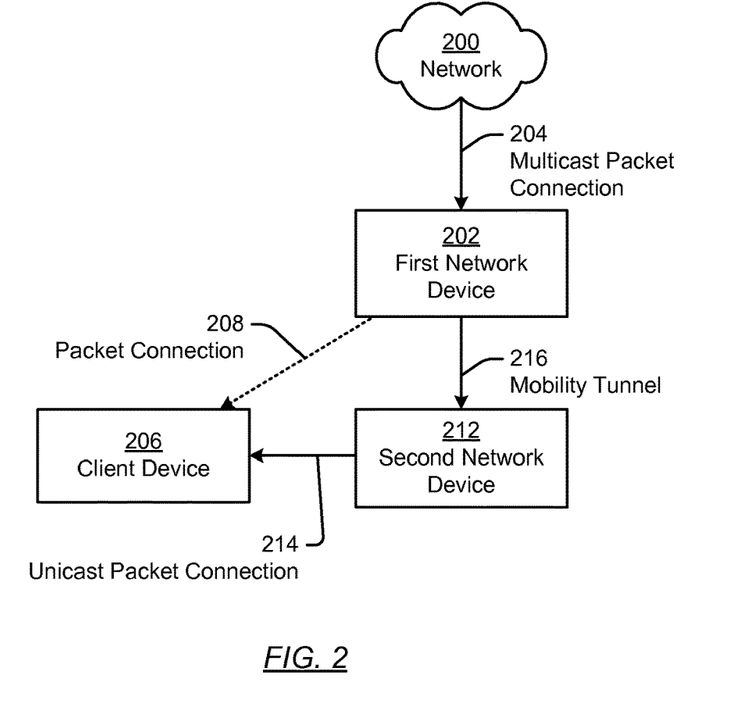

FIG. 2 shows a schematic diagram of a system in accordance with one or more embodiments. Specifically, FIG. 2 shows a schematic diagram for receiving a multicast packet from a network (200). The network (200) may be a network from which the packet originates. The first network and second network in FIG. 1 are not shown in FIG. 2 to simplify the Figure. The network (200) is connected to a first network device (202) via a multicast packet connection (204). In other words, the first network device (202) is configured to receive multicast packets via the multicast packet connection (204) from the network (200). A multicast packet connection (204) is a logical connection to the network (200). The same physical structure may exist and be used to receive multicast packets as to receive unicast packets.

Further, at a first time period, the first network device (202) is connected to a client device (206) via a packet connection (208). The first network device (202) provides to the client device (206) multicast packets that specify a destination address of the first network device (202). For example, the destination address may be a VLAN of the first network device (202). The packet connection (208) may be a unicast packet connection and/or a multicast packet connection. In other words, when a multicast packet is received by the first network device, the first network device or a separate device between the first network device and the client device may change the multicast packet to a unicast packet. Alternatively, the client device may receive the multicast packet. In other words, the multicast packet received by the first network device (202) may be relayed to the client device.

In a second time period, the client device (206) has roamed to a second network device (212). The second network device (212) may be directly connected to the network (200) or connected to the network via the first network device (202). The client device (206) is connected to the second network device (212) via a unicast packet connection (214). In one or more embodiments, the second network device (212) includes functionality to transmit unicast packets to the client device (206). In one or more embodiments, in order for the client device (206) to continue to receive multicast packets that specify the destination address of the first network device (202), a mobility tunnel (216) exists between the first network device (202) and the second network device (212).

A mobility tunnel (216) is a logical structure that identifies to the first network device and the second network device that one or more client devices of the first network device have roamed to the second network device. In other words, a mobility tunnel defines a packet transmission relationship from the first network device to the second network device. In one or more embodiments, the mobility tunnel connects only two endpoints (e.g., the first network device, the second network device). In one or more embodiments, the same mobility tunnel (216) may be used for each client device that roamed from the first network device to the second network device.

As used in the present application, the use of the term "first" in "first network device" and "second" in "second network device" is to indicate that the first network device is distinct from the second network device, that the roamed client device is to receive packets that were originally directed to the first network device, and that the mobility tunnel for the roamed client device is to the second network device. A third network device may exist for connecting to the roamed client device with another mobility tunnel between the second network device and the third network device.

Figure 3:
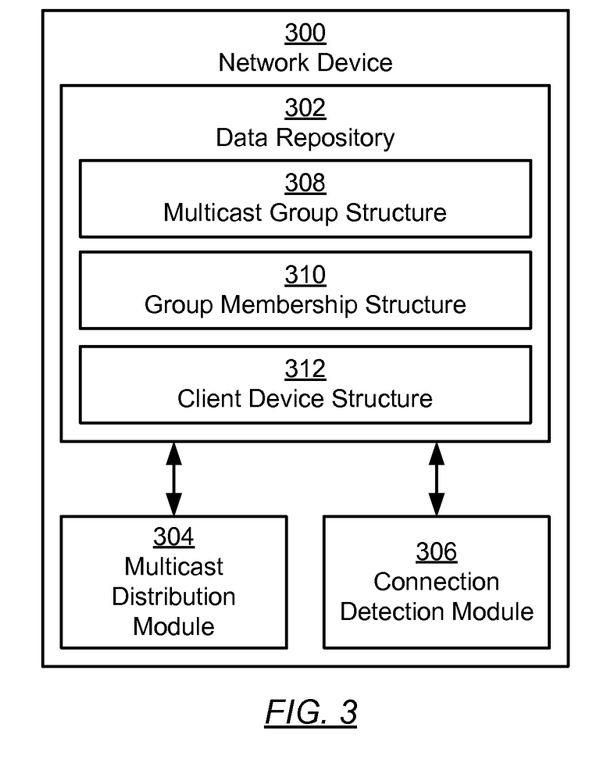

FIG. 3 shows a schematic diagram of a network device (300) in accordance with one or more embodiments. As shown in FIG. 3, the network device (300) may include a data repository (302), a multicast distribution module (304), and a connection detection module (306). Each of these components is discussed below.

In one or more embodiments, the data repository (302) is any type of storage unit and/or device (e.g., a file system, database, collection of tables, or any other storage mechanism) for storing data. Further, the data repository (302) may include multiple different storage units and/or devices. The multiple different storage units and/or devices may or may not be of the same type or located at the same physical site.

In one or more embodiments, a multicast group structure (308) is a data structure that relates incoming multicast packet information to a mobility multicast group. A mobility multicast group is a group whose members are connections to roamed client devices. For connections between network devices, the members of a mobility multicast group include one or more mobility tunnels. When the network device is a controller and the connection is to an access point of the controller, the mobility multicast group includes a tunnel to the access point. Each mobility multicast group is assigned a mobility multicast group identifier. The mobility multicast group identifier is a unique identifier on the network device having the multicast group structure for the mobility multicast group.

Figure 4:
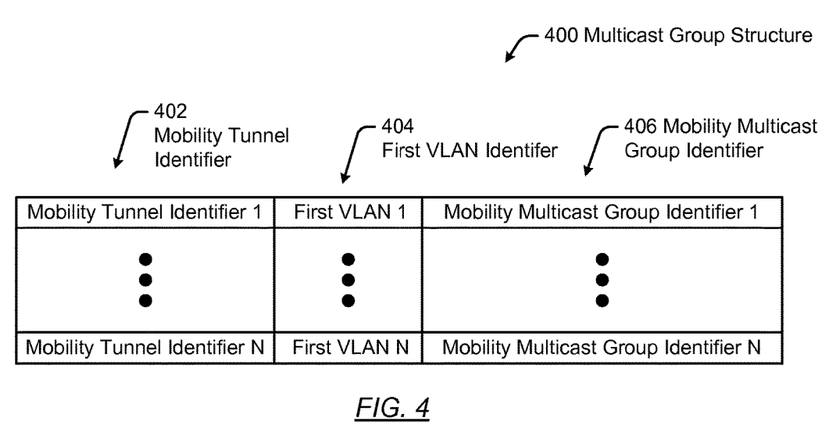

Returning to the multicast group structure, the incoming multicast packet information in the multicast group structure on the first network device is a VLAN of the first network device and a default value in accordance with one or more embodiments. Thus, the multicast group structure for the first network device indicates that roamed client devices exist for a particular VLAN in accordance with one or more embodiments. The incoming multicast packet information in the multicast group structure on the second network device is a VLAN of the first network device and an incoming mobility tunnel identifier in accordance with one or more embodiments. Thus, the multicast group structure on the second network device relates an incoming mobility tunnel to the connections to the roamed client devices. An example diagram of the multicast group structure is shown in FIG. 4 and discussed below in accordance with one or more embodiments.

Continuing with FIG. 3, a group membership structure (310) relates mobility multicast group identifiers to the connections to the roamed client devices in accordance with one or more embodiments. For example, the group membership structure may include a list of one or more mobility tunnels for each mobility multicast group identifier. Although not shown in FIG. 3, rather than having a multicast group structure that is separate from the group membership structure, the group membership structure may be combined into the multicast group structure. For example, a separate entry may exist in the multicast group structure for each connection to a roamed client device.

Figure 6:
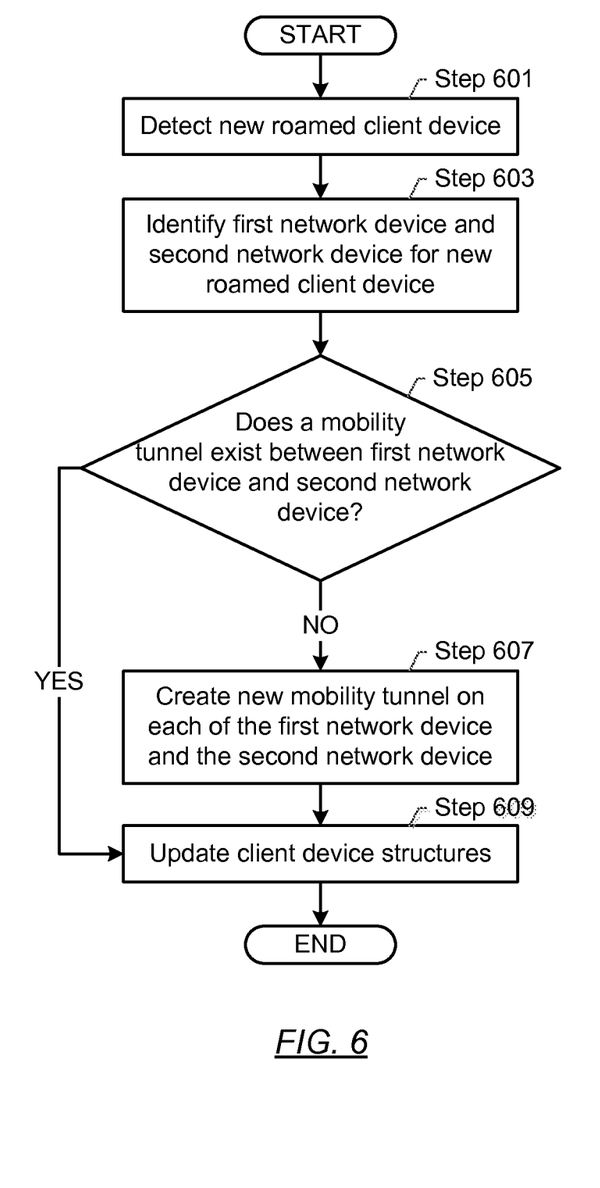
FIGS. 6-8 show flowcharts in accordance with one or more embodiments.

In one or more embodiments, a client device structure (312) identifies addresses for connecting to individual client devices. The client device structure may include an entry for each client device connected to the network device as well as each roamed client device of the network device. For example, if the roamed client device roamed from the first network device to the second network device, the client device structure of the first network device may include addressees of client devices connected to the first network device and addresses of the roamed client device. Continuing with the example, the client device structure of the second network device may include identifiers of client devices connected to the second network device (including the roamed client device), and any roamed client devices of the second network device. An example diagram of the client device structure is shown in FIG. 6 and discussed below in accordance with one or more embodiments.

Continuing with FIG. 3, the multicast distribution module (304) is hardware, software, firmware, or a combination thereof that includes functionality to distribute multicast packets for the network device (300). Specifically, the multicast distribution module (304) includes functionality to manage the transmission of multicast packets to client devices connected to the network device (300), roamed client devices of the network device (300), and roamed client devices that roamed to the network device (300). The multicast distribution module (304) may include functionality to access the data repository (302) to perform the transmission of the multicast packets.

In one or more embodiments, the connection detection module (306) is hardware, software, firmware, or a combination thereof that includes functionality to identify changing connections to roamed client devices and update the data repository (302). For example, the connection detection module (306) may include functionality to identify a roaming client device and update the multicast group structure (308), the group membership structure (310), and the client device structure (312) when a client device roams from a first network device to a second network device. The connection detection module may further include functionality to identify further roaming of the client device and update the multicast group structure (308), the group membership structure (310), and/or the client device structure (312) when the client device roams from the second network device to a third network device.

Although not shown in FIG. 3, if the network device (300) provides controller functionality, access point functionality, switch functionality, or any combination thereof, then the connection may include additional components (not shown) for a controller, an access point, a switch, or a combination thereof.

FIG. 4 shows an example diagram of the multicast group structure in accordance with one or more embodiments. Specifically, FIG. 4 presents the multicast group structure (400) in table format. Although FIG. 4 shows the multicast group structure in table format, any data structure may be use.

Each row in the table corresponds to an entry in the multicast group structure (400). In one or more embodiments, each entry includes a mobility tunnel identifier (402), a first VLAN identifier (404), and a mobility multicast group identifier (406).

A mobility tunnel identifier (402) is a unique identifier of a mobility tunnel. In one or more embodiments, the mobility tunnel identifier (402) may be unique at least on the first network device and the second network device. In alternative or additional embodiments, the mobility tunnel identifier (402) may be different at the first network device than at the second network device for the same mobility tunnel. In other words, for a particular mobility tunnel, the mobility tunnel identifier (402) may be set to a default value (e.g., 0, 1, etc.) indicating that a roamed away client device exists at the first network device, and the mobility tunnel identifier (402) may be set to a unique identifier at the second network device.

The first VLAN identifier (404) is an identifier of the VLAN to which the roamed client device was connected at the first network device. In other words, when the client device is connected to the first network device, the client device is connected to a particular VLAN. The first VLAN identifier (404) is the identifier of the particular VLAN. In one or more embodiments, the first VLAN identifier (404) is unique amongst VLANs of the first network device, and may not be unique amongst VLANs of other network devices. For example, the client device may be connected to a first VLAN identified by a first VLAN identifier at the first network device, roam to a second network device to be connected to a second VLAN identified by a second VLAN identifier, and have the first VLAN identifier be identical to the second VLAN identifier even though the VLANs are different.

In one or more embodiments, a mobility multicast group identifier (406) is an identifier of a mobility multicast group to which the packets are directed. A mobility multicast group is a group whose members are connections to roamed client devices. In other words, the members of the mobility multicast group are not the roamed client devices, but rather specify a connection mechanism (e.g., tunnels) to connect (i.e., connections) to one or more roamed client devices in accordance with one or more embodiments. The mobility multicast group may be connections to at least a subset of the multicast group to which the packet is initially directed. At the first network device, the mobility multicast group may include mobility tunnels to roamed client devices as members. At the second network device, the mobility multicast group may include connection destinations to roamed client devices (e.g., an address of the roamed client device, another mobility tunnel to the roamed client device).

Figure 5:
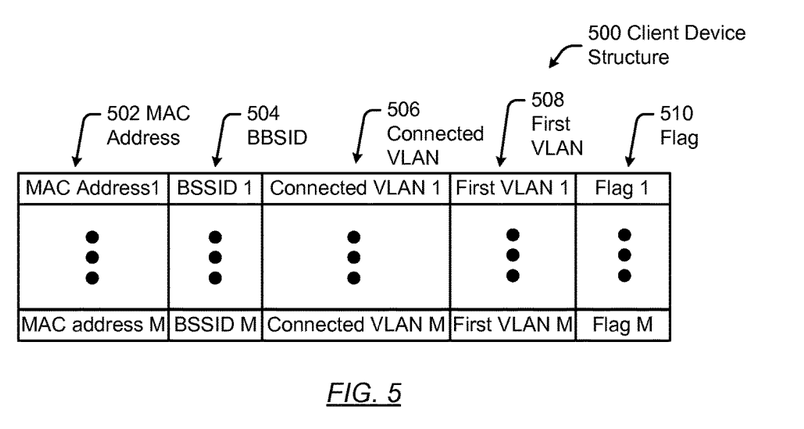

FIG. 5 shows an example client device structure in accordance with one or more embodiments. Specifically, FIG. 5 presents the client device structure (500) in table format. Although FIG. 5 shows the client device structure in table format, any data structure may be use.

Each row in the table corresponds to an entry in the client device structure (500). In one or more embodiments, each entry in the client device structure (500) may include a media access control (MAC) address (502), a basic service set identifier (BSSID) (504), a connected VLAN identifier (506), a first VLAN identifier, and a flag (510).

In one or more embodiments, the MAC address (502) is a unique address for a particular network interface hardware device (e.g., network interface card) that is at least a component of the client device. The MAC address (502) may be assigned by a manufacturer of the network interface hardware device. The MAC address (502) uniquely identifies the client device.

In one or more embodiments, the BSSID (504) is an identifier of a service set to which a client device is currently connected. In one or more embodiments, a service set is a set of all devices connected to a particular LAN, wired or wireless. For example, the BSSID (504) may be an identifier of an access point connected to the client device and all connected client devices of the access point.

In one or more embodiments, the connected VLAN identifier (506) is a unique identifier of the VLAN to which the client device is connected. For example, if the client device is connected to the first network device, the connected VLAN identifier may be a first VLAN identifier of the first network device. If the client device is connected to a second network device, the connected VLAN identifier may be an identifier of the VLAN to which the client device has roamed on the second network device.

In one or more embodiments, the first VLAN identifier (508) may be the same or similar to the first VLAN identifier (404) in FIG. 4. In one or more embodiments, the flag (510) is an identifier indicating whether the client device is a roamed client device. For example, the flag may be a bit that is set when the client device is a roamed client device.

Although FIGS. 4 and 5 show a set of fields in the multicast group structure and the client device structure, additional fields may be added, some fields may be removed, and/or some fields may be combined. Thus, FIGS. 4 and 5 show only an example of a client device structure in accordance with one or more embodiments.

Figure 7:
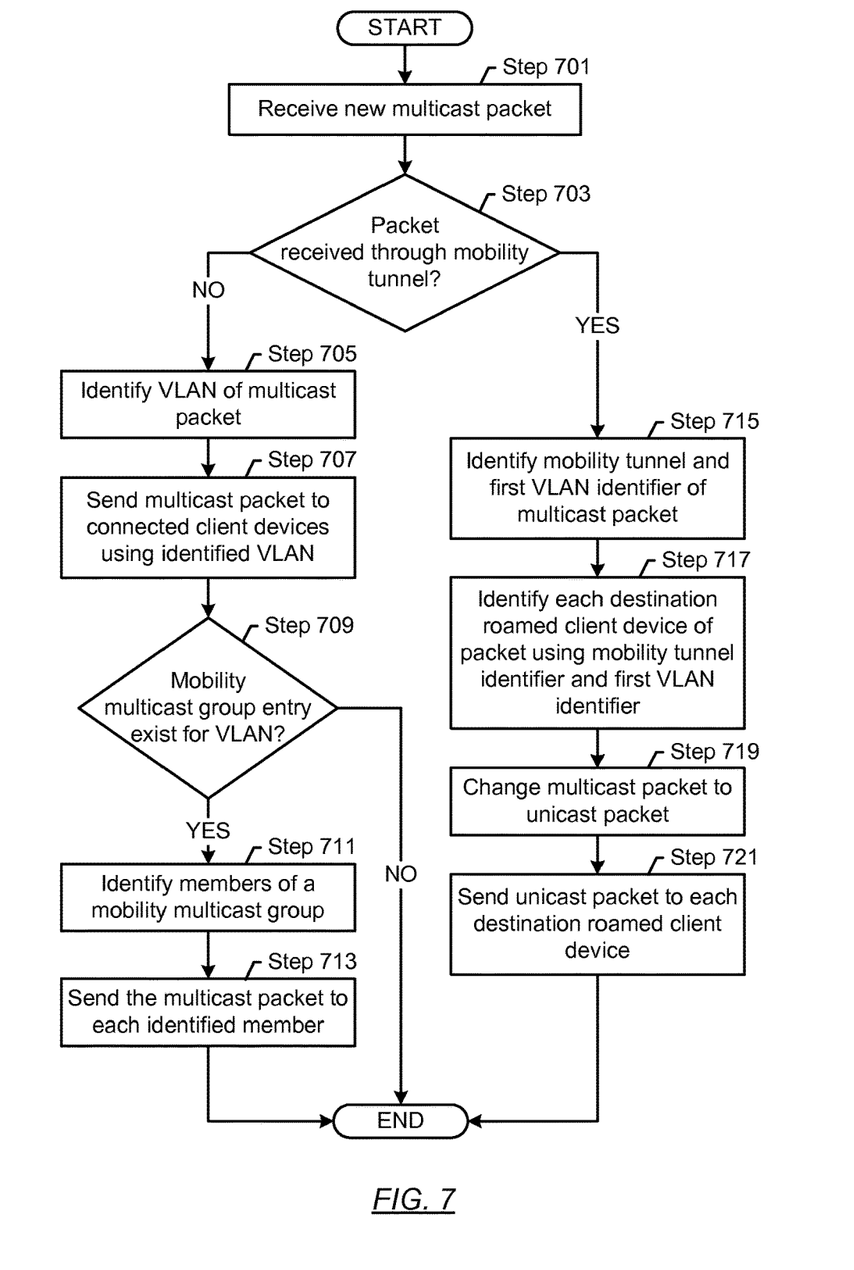
Figure 8:
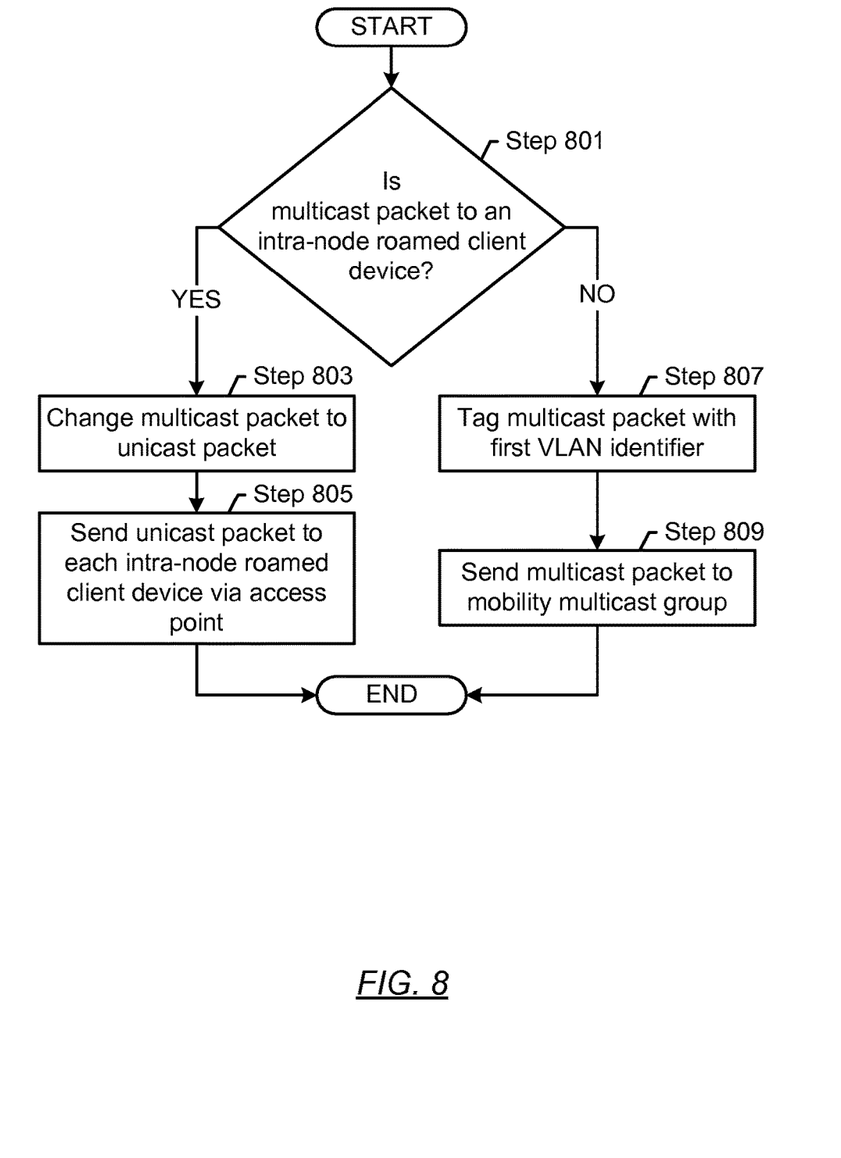

FIGS. 6-8 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

FIG. 6 shows a flowchart for managing roamed client devices in accordance with one or more embodiments. In Step 601, a new roamed client device is detected in accordance with one or more embodiments. A new roamed client device is detected when an existing client device in the system accesses a different network device. The following are some examples of roamed client devices in accordance with one or more embodiments.

In a first example, consider the scenario in which the first network device is a controller and the client device roams between access points connected to the controller. In the example, a client device is detected as roaming when the client device moves from a previous access point connected to the controller to a new access point connected to the controller.

In a second example, consider the scenario in which the first network device is a first access point that may or may not provide controller functionality and the second network device is a second access point that may or may not provide controller functionality. In the example, a client device is detected as roaming when the client device moves from the first access point to the second access point.

In a third example, consider the scenario in which the first network device is a controller and the second network device is a controller. In the example, a client device is detected as roaming when the client device moves from an access point connected to the first controller to an access point connected to the second controller.

Other configurations beyond the examples presented above may exist. Thus, other methods for detecting a roamed client device may be used without departing from the scope of the claims.

In Step 603, a first network device and a second network device is identified for the new roamed client device in accordance with one or more embodiments. In one or more embodiments, the first network device identifies the second network device as having a newly roamed client device. The first network device may identify the second network device based on a notification from the second network device. For example, the second network device may publish the MAC address of new client devices that are connecting to the second network device. Based on the MAC address, the first network device may determine that one of the client devices that was connected to the first network device and is now connected to the second network device. The first network device may or may not notify the second network device of the roaming status of the roamed client device. For example, if the first network device and the second network device are controllers or provide controller functionality, the first network device may notify the second network device that the client device is a roamed client device. By way of another example, if the first network device is a controller and the second network device is an access point connected to the controller, the first network device may not notify the second network device of the roaming status of the client device.

In Step 605, a determination is made whether a mobility tunnel exists between the first network device and the second network device in accordance with one or more embodiments. In one or more embodiments, determining whether a mobility tunnel exists may be performed by querying the client device structure, the multicast group structure, and the group membership structure. In particular, the client device structure on the first network device may be queried to identify the first VLAN of the newly roamed client device. A mobility tunnel may be determined to exist when the first VLAN of the roamed client device is related to a mobility multicast group identifier in the multicast group structure and the mobility multicast group identifier is related to a mobility tunnel connecting to the second network device in the group membership structure in accordance with one or more embodiments. Other mechanisms for determining whether a mobility tunnel exists may be used without departing from the scope of the claims. Additionally, if different structures are used, the different structures may be queried to determine whether a mobility tunnel exists without departing from the scope of the claims.

In Step 607, if a mobility tunnel does not exist, then a new mobility tunnel is created between the first network device and the second network device in accordance with one or more embodiments. In one or more embodiments, creating the new mobility tunnel may include updating the multicast group structure and the group membership structure on the first network device and/or the second network device. For example, a mobility tunnel identifier may be agreed upon by the first network device and the second network device. If an entry does not exist for the first VLAN and mobility tunnel identifier in the multicast group structure, than an entry may be created, where the entry includes the mobility tunnel identifier or a default value, the first VLAN, and a multicast group address. For the first network device, the group membership structure may be updated to associate the multicast group address with the mobility tunnel identifier. For the second network device, the group membership structure may be updated to associate the multicast group address with another mobility tunnel or a destination identifier of the roamed client device.

Regardless of whether a mobility tunnel exists, in Step 609, client device structures are updated in accordance with one or more embodiments. In one or more embodiments, the client device structure at the first network device is updated to reflect that the client device is a roamed client device. In one or more embodiments, the client device structure at the second network device may be updated to reflect information about the new client device (e.g., MAC address, BSSID, and other information), the first VLAN obtained from the first network device, and that the client device is a roamed client device.

In one or more embodiments in which the network device is a controller, if a client device roams from a first access point on the controller to a second access point on the controller, the controller may update the multicast group structure, the group membership structure, and the client device table to reflect the roamed client device. Specifically, rather than a mobility tunnel between network devices, a mobility tunnel may be created from the controller to the access point. In such embodiments, the second access point may or may not have functionality to process multicast messages. Thus, the second access point may or may not include the multicast group structure, group membership structure, and client device structure in accordance with one or more embodiments.

FIG. 7 shows a flowchart for receiving a multicast packet in accordance with one or more embodiments. In Step 701, a new multicast packet is received in accordance with one or more embodiments. Receiving the new multicast packet may be performed through a hardware network interface device. The multicast packet may be processed through one or more levels of the network stack.

In Step 703, a determination is made whether the packet is received through a mobility tunnel in accordance with one or more embodiments. Determining whether a packet is received through a mobility tunnel may be performed by determining whether the packet is tagged with a mobility tunnel identifier. In one or more embodiments, a packet is tagged with the mobility tunnel identifier when the packet includes a field that has a mobility tunnel identifier. Other mechanisms for tagging a packet may be used without departing from the scope of the claims.

In Step 705, if the packet is not received through the mobility tunnel, then the VLAN of the multicast packet is identified in accordance with one or more embodiments. In one or more embodiments, the VLAN of the multicast packet is extracted from a predefined field in the multicast packet.

In Step 707, the multicast packet is sent to connected client devices using the identified VLAN in accordance with one or more embodiments. In other words, the multicast packet is sent to client devices that are both members of the VLAN and connected to the network device (i.e., not roaming). In one or more embodiments, the client device structure may be accessed to identify all client devices that are connected to the network device and members of the VLAN. In particular, if the first VLAN matches the identified VLAN and the client device does not have a flag set indicating that the client device is a roamed client device, then the client device is identified as a connected client device. The packet may remain as a multicast packet when sent to the identified client devices. Alternatively, the packet may be changed to a unicast packet and sent directly to the identified client devices.

In Step 709, a determination is made whether a mobility multicast group entry exists for the VLAN in accordance with one or more embodiments. In one or more embodiments, determining whether a mobility multicast group entry exists may be performed using the multicast group structure and the group membership structure. For example, determining whether mobility tunnels exist may be performed by determining whether an entry that has a default value as the mobility tunnel identifier for the VLAN identified in Step 705. If an entry has a default value as the mobility tunnel identifier for the VLAN, then a mobility multicast group exists. In one or more embodiments, if a mobility multicast group entry exists, then one or more mobility tunnels exist in accordance with one or more embodiments.

In Step 711, the members of the mobility multicast group are identified in accordance with one or more embodiments. The members may be mobility tunnels to other network devices are an intra-network device tunnel in accordance with one or more embodiments. Members may be identified by performing a search in the multicast group structure and the group membership structure in accordance with one or more embodiments. For example, the mobility multicast group entry, which is in the entry identified in the example in Step 709, may be used to access the group membership structure.

In Step 713, the multicast packet is sent to each identified member in accordance with one or more embodiments. In one or more embodiments, prior to sending the multicast packet, the multicast packet is tagged with the VLAN identifier. The first network device may forward the tagged multicast packet using the tunnel identifier to the second network device. When the multicast packet is sent to another network device, the multicast packet may retain the multicast form. In other words, even though multiple roamed client devices of the first network device may exist and be connected via the mobility tunnel, a single multicast packet may be sent.

In one or more embodiments, when two or more client devices roam away from the first network and first network device to a same second network, a mobility multicast group exists. Thus, determining that the two or more client devices have roamed from the first network to a same second network may be performed by determining that a mobility multicast group exists. In other words, the first network device may not have any indication of the number of client devices that roamed away from the first network when and after determining that the two or more client devices have roamed from the first network to a same second network. Further, based on the determining, a single copy of the data in the packet is forwarded to the second network for distribution to each of the two or more devices in Step 713 in one or more embodiments. In other words, the single multicast packet is sent to the identified member, which may have multiple roamed devices. In some embodiments, multiple multicast packets may be transmitted to the same second network, whereby at least one single multicast packet is for two or more roamed devices in the same second network. Further, as part of forwarding the data, the data may be encrypted by the first roamed device.

Returning to Step 703, if a determination is made that the packet is received through the mobility tunnel, then in Step 715, the mobility tunnel and first VLAN identifier of the multicast packet is identified in accordance with one or more embodiments. The first VLAN identifier and the mobility tunnel may be extracted from predefined positions in the multicast packet.

In Step 717, each destination roamed client device of the packet is identified using the mobility tunnel identifier and the first VLAN identifier in accordance with one or more embodiments. In one or more embodiments, identifying the destination roamed client device may be performed by identifying the mobility multicast group using the mobility tunnel identifier and the first VLAN identifier as a lookup into the multicast group structure. A query may be performed in the group membership structure to obtain mobility tunnels or other connections to the destination roamed client devices. Further, in one or more embodiments, a query may be performed in the client device structure to identify which client devices are roamed client devices that are associated with the first VLAN identifier of the first network device and the multicast packet.

In Step 719, the multicast packet is changed to the unicast packet in accordance with one or more embodiments. In one more or more embodiments, changing a multicast packet to a unicast packet may be performed by setting the destination address of the multicast packet to a destination address assigned to a particular client device. Additional changes may be made, such as changing field identifiers that identify the multicast packet as being a multicast packet.

In Step 721, the unicast packet is sent to each destination roamed client device in accordance with one or more embodiments. Sending the unicast packet may be performed using virtually any technique for sending packets.

Although FIG. 7 shows a flowchart whereby packets are changed to unicast packets when the packet is received via a mobility tunnel, packets received via a mobility tunnel may be transmitted on another mobility tunnel, such as by using a similar method as discussed above with respect to Steps 709-713. Further, packets received via the mobility tunnel may be maintained as multicast packets rather than changed into unicast packets to send to the client devices in accordance with one or more embodiments.

FIG. 8 shows an example flowchart in which the first network device is a controller, and the mobility tunnel is directed to an access point or another controller in accordance with one or more embodiments. In Step 801, a determination is made whether the multicast packet is to an intra-node roamed client device. An intra-node roamed client device may be a different access point of the same network device.

In Step 803, if the mobility tunnel is to an intra node roamed client device, the multicast packet is changed to a unicast packet. In Step 805, the unicast packet is sent to each intra-node roamed client device via the second network device. In other words, the unicast packet is transmitted to the roamed to access point. The roamed to access point may receive the unicast packet and forward the unicast packet to the client device.

Returning to Step 801, if the mobility tunnel is not to an intra node roamed client device, the mobility tunnel may be to a different controller. In Step 807, the multicast packet is tagged with the first VLAN identifier. In other words, the first VLAN identifier may be added to the multicast packet. In Step 809, the multicast packet is sent to the mobility multicast group via the mobility tunnel in accordance with one or more embodiments. The second network device may forward the multicast packet to the roamed client device.

Although not presented in FIGS. 6-8, reference counters may be used to count the number of client devices connected to a mobility tunnel. Thus, tunnels may be removed when client devices further roam, disconnect, or move back to the first network device.

Figure 9:
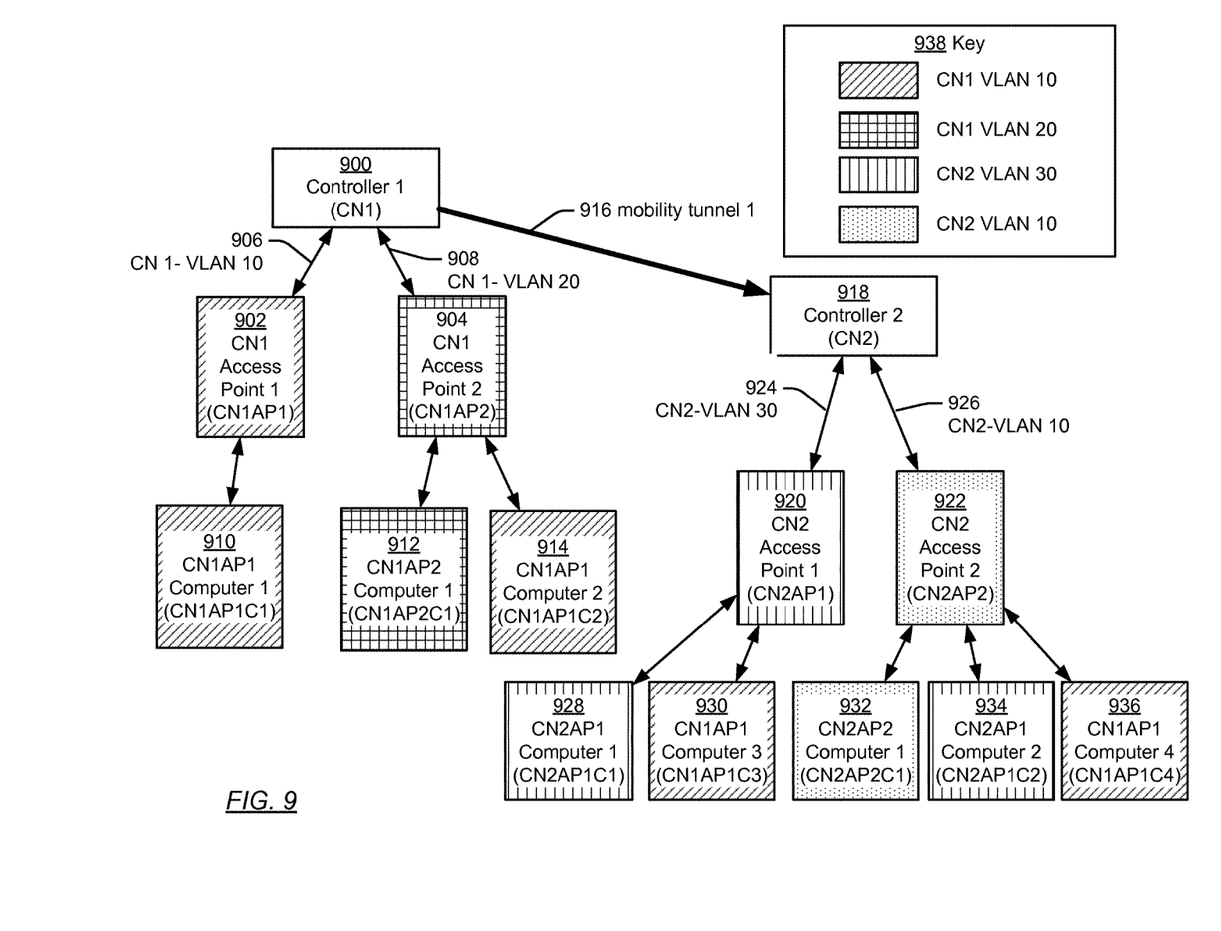
FIG. 9 shows an example in accordance with one or more embodiments.

The following example is for explanatory purposes only and not intended to limit the scope of the claims. FIG. 9 shows an example in accordance with one or more embodiments. In the example, controller performs the functionality of network devices, and computers are client devices. In FIG. 9, controllers are denoted as CN, access points are denoted as AP, and computers are denoted as C. The number after the component (e.g., controller, access point, computer) is a number assigned to a particular component. For simplicity purposes, the name of the access points and computers is derived from the name of the VLAN to which the access point is connected and to which the computer is originally registered for receiving packets.

As shown in FIG. 9, controller 1 (CN1) (900) is connected to CN1 Access Point 1 (CN1AP1) (902) and CN1 Access Point 2 (CN1AP2) (904). Specifically, CN1 (900) is connected to CN (902) via CN1-VLAN 10 (906), and connected to CN1AP2 (904) via CN1-VLAN 20 (908). CN1AP1 (902) is connected to CN1AP1 Computer 1 (CN1AP1C1) (910). CN (904) is connected to CN Computer 1 (CN1AP2C1) (912) and CN Computer 2 (CN1AP1C2) (914).

CN1 (900) is connected to Controller 2 (CN2) (918) via Mobility tunnel 1 (916). The connections via the Mobility tunnel 1 (916) may be wired and/or wireless and may be through a network (not shown) connected to each controller (e.g., CN1 (900) and CN2 (918)). CN2 (918) is connected to CN2 Access Point 1 (CN2AP1) (920) and CN2 Access Point 2 (CN2AP2) (922). Specifically, CN2 (918) is connected to CN2AP1 (920) via CN2-VLAN 30 (924), and connected to CN2AP2 (922) via CN2-VLAN 10 (926). CN2AP1 (920) is connected to CN2AP1 Computer 1 (CN2AP1C1) (928) and CN Computer 3 (CN1AP1C3) (930). CN2AP2 (922) is connected to CN2AP2 Computer 1 (CN2AP2C1) (932), CN2AP1 Computer 2 (CN2AP2C2) (934), and CN1AP1 Computer 4 (CN1AP1C4) (936).

For visualization purposes, the background shading of the access points and computers is defined by the name of the VLAN to which the access point is connected and to which the computer is originally registered for receiving packets. A key (938) denotes the VLAN of the access point and to which the computer is originally connected. As shown in FIG. 9, CN1AP1C2 (914) performed an intra-controller roaming from CN1AP1 (902) to CN1AP2 (904). CN1AP1C3 (930) and CN1AP1C4 performed an inter-controller roaming from CN1 (900) to CN2 (918). CN2AP1C2 (934) performed an intra-controller roaming from CN2AP1 (920) to CN2AP2 (922).

Below is an example multicast group structure at CN1 (900).

| Tunnel-Id | First VLAN | Mobility multicast-Group Address |
|---|---|---|
| 0 | 10 | MG-CN-1 |

As shown in the above table, VLAN 10 is identified as having roamed away computers. The connections to computers that are roamed away may be found in the mobility multicast group MG-CN-1. The group membership structure lists members of MG-CN-1 as Mobility tunnel 1 (916) and CN1-AP2-Tunnel, which is a tunnel (not shown) from CN1 (900) to CN1AP2 (904).

Further, CN1 may have the following client device table, which is trimmed for simplicity, to remove fields and entries not relevant to the example:

| MAC | BSSID | Connected VLAN | First VLAN | FLAG |
|---|---|---|---|---|
| CN1AP1C1 | CN1-AP1-BSSID | 10 | 10 | 0 |
| CN1AP2C1 | CN1-AP2-BSSID | 20 | 20 | 0 |
| CN1AP1C2 | CN1-AP2-BSSID | 20 | 10 | R |

In the above client device table, "R" indicates a roamed client device, CN1-AP1-BSSID is the BSSID for CN1AP1 (902), and CN1-AP2-BSSID is the BSSID for CN1AP2 (904).

Below is an example multicast group structure at CN2 (918).

| Tunnel-Id | First VLAN | Mobility multicast-Group Address |
|---|---|---|
| Mobility tunnel 1 | 10 | MG-CN2-1 |
| 0 | 30 | MG-CN2-2 |

As shown in the above table, VLAN 10 from Mobility tunnel 1 and VLAN 30, which is local as shown by 0 is identified as having roamed away computers. The connections to computers that are roamed to CN2 via Mobility tunnel 1 may be found in the mobility multicast group MG-CN2-1. The group membership structure lists members of MG-CN2-1 as CN2-AP1-Tunnel, which is a tunnel (not shown) from CN2 (918) to CN2AP1 (920), and CN2-AP2-Tunnel, which is a tunnel (not shown) from CN2 (918) to CN2AP2 (922).

The connections to computers that are roamed away from CN2 VLAN 30 may be found in the mobility multicast group MG-CN2-2. The group membership structure lists members of MG-CN2-2 as CN2-AP2-Tunnel.

Further, CN2 may have the following client device table, which is trimmed for simplicity, to remove fields and entries not relevant to the example:

| MAC | BSSID | Connected VLAN | First VLAN | FLAG |
|---|---|---|---|---|
| CN2AP1C1 | CN2-AP1-BSSID | 30 | 30 | 0 |
| CN1AP1C3 | CN2-AP1-BSSID | 30 | 10 | R |
| CN2AP2C1 | CN2-AP2-BSSID | 10 | 10 | 0 |
| CN2AP1C2 | CN2-AP2-BSSID | 10 | 20 | R |
| CN1AP1C4 | CN2-AP2-BSSID | 10 | 10 | R |

In the above client device table, "R" indicates a roamed client device, CN2-AP1-BSSID is the BSSID for CN2AP1 (920), and CN2-AP2-BSSID is the BSSID for CN2AP2 (922).

Continuing with the example, consider a first scenario in which CN1 (900) receives multicast traffic (in the form of one or more multicast packets) on VLAN 10. In the example first scenario, multicast traffic is flooded to clients locally homed on CN1-VLAN-10 (906). In other words, the multicast traffic is sent to CN1AP1C1 (910). Prior to sending the multicast traffic, the traffic may be converted to unicast traffic.

The flooding continues and extends to roamed away clients by performing a query to the multicast group structure at CN1 (900) with a key of 0 for the tunnel identifier and 10 for the First VLAN. In this case, result is MG-CN-1. Thus, the destination will be set to multicast-group 'MG-CN-1'. Packets are therefore processed with a destination set to MG-CN-1. Based on the members being a mobility tunnel (Mobility tunnel 1 (916)) and an AP tunnel (CN1-AP2-Tunnel), the following actions may be performed in the example.

For AP-tunnel destination, for each client device associated with the CN1-AP2-Tunnel, which is the CN1-AP2-BSSID, an L2 unicast converted traffic is sent to the computer if the computer client device is roamed away (i.e., 'r' flag set in client device entry) and the first VLAN matches with the VLAN in the multicast traffic. In this case, the client device structure has an entry CN1AP1C2 matching the criteria. Thus, the multicast traffic is sent as unicast traffic to CN1AP1C2 (914) via CN1AP2 (904).

Continuing with the first scenario in the example, for Mobility tunnel 1 (916), the multicast traffic is sent via the mobility tunnel 1 (916) and tagged with the First VLAN 10.

In a second scenario, CN1 receives multicast traffic on VLAN 20. In the second scenario, the multicast traffic is flooded to any computer (i.e., CN1AP2C1 (912)) associated with VLAN-20 in the client device table and skip visitors (i.e., CN1AP1C2 (914)). Based on a query to the multicast group structure at CN1 (900), no entry exists that has a tunnel ID of 0 and a first VLAN of 20. Thus, no tunnels are deemed to exist.

In a third scenario, CN2 (918) receives a multicast packet over mobility tunnel 1 (916). In particular, the multicast packet from CN1 (900) is received by CN2 (918) via mobility tunnel 1 (916) and tagged with VLAN-10. CN2 (918) decodes the tag and sets the First-VLAN (i.e., 10). Based on a query to the multicast group structure having a key of <mobility tunnel 1, first VLAN 10>, the packet is forwarded to multicast destination MG-CN2-1. The packet egress may be set to MG-CN2-1 multicast group and the packet is forwarded.

Based on the destination being MG-CN2-1, the group membership structure on CN2 (918) may be accessed to identify the member as CN2-AP1-Tunnel, CN2-AP2-Tunnel. In the client device table, for each client device associated to CN2-tunnel→bssid, L2 multicast-to-unicast converted packets is sent if client device is visitor (i.e., has the 'r' flag set) and the First-VLAN matches the packet VLAN (i.e., VLAN 10') derived from the packet. In this case, each tunnel has one client device each matching criteria. Thus, the packet is sent to CN1AP1C3 (930) via CN2AP1 (920) and CN1AP1C4 (936) via CN2AP2 (922).

In a final scenario for the example, consider the scenario in which CN2 (918) receives multicast traffic on VLAN 10. In the example, traffic is flooded to VLAN-10, which has 3 associated computers (i.e., CN2AP2C1 (932), CN2AP1C2 (934), and CN1AP1C4 (936)). However, due to 'r' flag check in the client device table on CN2 (918), the packet is only flooded CN2AP2C1 (932).

FIG. 9 and the associated example above is only an example for roamed client device handling of multicast traffic. One or more embodiments may deviate or be vastly different from the above example without departing from the scope of the claims.

One or more embodiments assist in identifying roamed clients and avoid unnecessary delays in forwarding pipeline. Further, by not converting traffic to unicast, duplicate traffic flow between different network devices may be avoided and thereby resulting in efficient bandwidth utilization. Additionally, by maintaining reference counters, scaling and performance may be enhanced in order to avoid leaking of traffic when no roamed away client device exists.

Additionally, unless expressly indicated to the contrary, the use of ordinal numbers (e.g., "first," "second," "third") in the description and the claims only indicates that the succeeding nouns modified by the ordinal numbers are distinct from the same noun having different ordinal number as a modifier. The use of the ordinal numbers, unless expressly indicated to the contrary, does not indicate a particular position or ordering of the succeeding nouns.

While the invention has been described with respect to a limited number of embodiments, those skilled in the art, having benefit of this disclosure, will appreciate that other embodiments can be devised which do not depart from the scope of the claims as disclosed herein. Accordingly, the scope should be limited only by the attached claims.

What is claimed is:

1. A non-transitory computer readable medium comprising instructions which, when executed by a processor, cause the processor to:
update a client device structure, a multicast group structure, and a group membership structure at a first network device to indicate that at least one of a first client device and a second client device is a roamed client device, wherein the client device structure includes a virtual local area network (VLAN) identifier, wherein the first client device and second client device are part of a mobility multicast group, the VLAN identifier is an identifier of the VLAN to which the roamed client device was connected at the first network device, and the VLAN identifier is unique to the first network device;
create a mobility tunnel between the first network device and a second network device when the first client device and the second client device are part of the mobility multicast group within a second network, wherein the mobility tunnel comprises a mobility tunnel identifier that is unique at least on the first network device and the second network device;
transmit, to the second network device, a multicast message wherein the multicast message includes the VLAN identifier and the mobility tunnel identifier;
convert the multicast message to a unicast message based on the mobility tunnel corresponding to an intra node roamed client device, wherein to convert the multicast message to the unicast message, the processor is configured to set a destination address of a multicast packet to a destination address assigned to a selected client device, and to change a field identifier that identifies a multicast packet; and
forward the unicast message to each of the first client device and the second client device in the mobility multicast group based on the multicast group structure on the first network device, the VLAN identifier, and the mobility tunnel identifier.

2. The non-transitory computer readable medium of claim 1, comprising instructions to determine that at least two client devices have roamed from a first network to a second network and to determine that one of the at least two client devices has roamed away from a Virtual Local Area Network (VLAN).

3. The non-transitory computer readable medium of claim 1, wherein the first network device comprises devices on a first IP subnet, and the second network device comprises devices on a second IP subnet different than the first IP subnet.

4. The non-transitory computer readable medium of claim 1, wherein the first network device comprises a first subset of devices on a particular IP subnet, and the second network device comprises a second subset of devices on the particular IP subnet.

5. The non-transitory computer readable medium of claim 1, wherein the instructions to forward the unicast message for distribution to each of two or more client devices comprises instructions to encrypt the unicast message and forward the unicast message to the second network device.

6. The non-transitory computer readable medium of claim 1, comprising instructions to tag the unicast message with a Virtual Local Area Network (VLAN) prior to forwarding the unicast message to the second network device, and wherein the second network device identifies two or more client devices based on the Virtual Local Area Network (VLAN).

7. A system comprising:
one or more hardware processors;
a memory on which is stored instructions that are to cause the one or more hardware processors to:
determine that at least two client devices have roamed from a first network to a same second network;
update a client device structure of one of the at least two client devices, a multicast group structure, and a group membership structure at a first network device to indicate that one of the at least two client devices is a roamed client device, wherein the client device structure includes a VLAN identifier, wherein a first client device and a second client device are part of a mobility multicast group, the VLAN identifier is an identifier of the VLAN to which the roamed client device was connected at the first network device, and the VLAN identifier is unique to the first network device;
create a mobility tunnel between the first network device and a second network device when the first client device and the second client device are part of the mobility multicast group within a second network, wherein the mobility tunnel comprises a mobility tunnel identifier that is unique at least on the first network device and the second network device;
transmit a single copy of a multicast message to the second network device wherein the single copy of the multicast message includes the VLAN identifier and the mobility tunnel identifier;
convert the multicast message to a unicast message based on the mobility tunnel corresponding to an intra node roamed client device, wherein the intra node roamed client device is roamed to associate with a different access point from the first network device, wherein to convert the multicast message to the unicast message, the one or more hardware processors are configured to set a destination address of a multicast packet to a destination address assigned to a selected client device, and to change a field identifier that identifies the multicast packet; and
forward a single copy of the unicast message to each of two or more client devices in the mobility multicast group based on the multicast group structure on the first network device the VLAN identifier, and the mobility tunnel identifier.

8. The system of claim 7, comprising instructions to determine that one of the at least two clients device has roamed away from a Virtual Local Area Network (VLAN) identified in the multicast message.

9. The system of claim 7, wherein the first network comprises devices on a first Internet Protocol (IP) subnet and the second network comprises devices on a second IP subnet different than the first IP subnet.

10. The system of claim 7, wherein the first network comprises a first subset of devices on a particular IP subnet and the second network comprises a second subset of devices on the particular IP subnet.

11. The system of claim 7, comprising instructions to encrypt the multicast packet and forward the multicast packet to the second network device.

12. The system of claim 7, comprising instructions to tag the multicast packet with a particular Virtual Local Area Network (VLAN) identified in the multicast message prior to forwarding the multicast packet to the second network device, and wherein the second network device identifies the two or more client devices based on the particular Virtual Local Area Network (VLAN).

13. A method comprising:
updating a client device structure, a multicast group structure, and a group membership structure at a first network device to indicate that at least one client device is a roamed client device, wherein the client device structure includes a VLAN identifier, wherein a first client device and a second client device are part of a mobility multicast group, the VLAN identifier is an identifier of the VLAN to which the roamed client device was connected at the first network device, and the VLAN identifier is unique to the first network device;
creating a mobility tunnel between the first network device and a second network device when the first client device and the second client device are part of the mobility multicast group within a second network, wherein the mobility tunnel comprises a mobility tunnel identifier that is unique at least on the first network device and the second network device;

transmitting a multicast message to the second network device in the second, wherein the multicast message includes the VLAN identifier and the mobility tunnel identifier;

converting the multicast message to a unicast message based on the mobility tunnel corresponding to an intra node roamed client device, wherein converting the multicast message to the unicast message comprises setting a destination address of a multicast packet to a destination address assigned to a selected client device, and changing a field identifier that identifies the multicast packet; and forwarding a single copy of the unicast message to each of two or more client devices in the mobility multicast group based on the multicast group structure on the first network device the VLAN identifier, and the mobility tunnel identifier.

14. The method of claim 13, wherein a determining operation comprises determining that the at least one client device has roamed away from a particular Virtual Local Area Network (VLAN) identified in the multicast message.

15. The method of claim 13, wherein a first network comprises devices on a first Internet Protocol (IP) subnet and the second network comprises devices on a second IP subnet different than the first IP subnet.

16. The method of claim 13, wherein a first network comprises a first subset of devices on a particular IP subnet and the second network comprises a second subset of devices on the particular IP subnet.

17. The method of claim 13, wherein forwarding, from the second network device in the second network, the single copy of the multicast packet in a unicast message to each of two or more client devices in the mobility multicast group comprises encrypting the multicast packet and forwarding the multicast packet to the second network device.

18. The method of claim 13, further comprising tagging the multicast packet with a particular Virtual Local Area Network (VLAN) identified in the multicast message prior to forwarding the multicast packet to the second network device, and wherein the second network device identifies the two or more client devices based on the particular Virtual Local Area Network (VLAN).

* * * * *